Sept. 9, 1958  C. W. CLARK, SR  2,850,894
HARDNESS TESTER WORK PIECE CLAMPING MEANS
Original Filed July 29, 1955  2 Sheets-Sheet 1
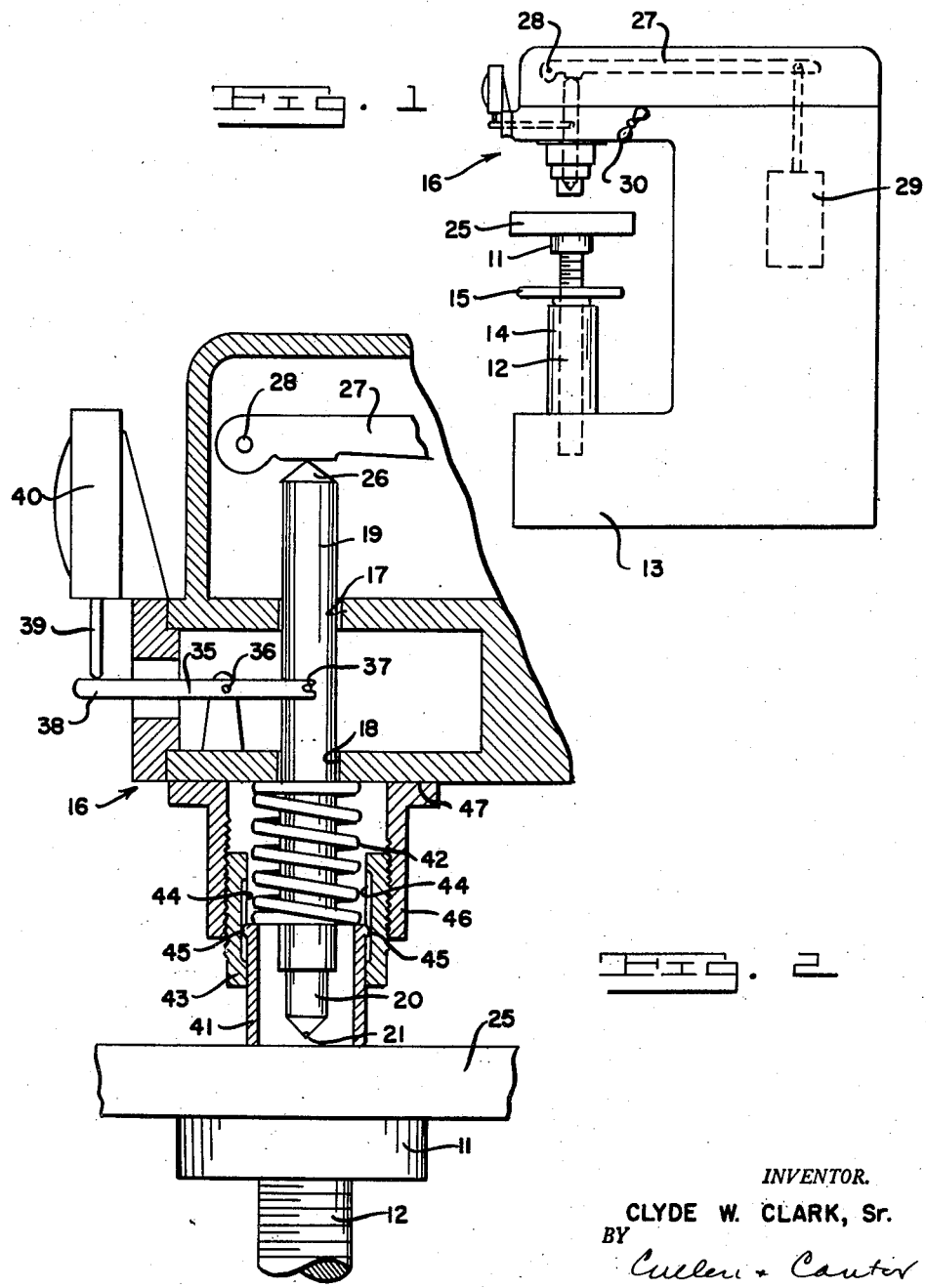
INVENTOR.
CLYDE W. CLARK, Sr.
BY
ATTORNEYS Sept. 9, 1958 C. W. CLARK, SR 2,850,894
HARDNESS TESTER WORK PIECE CLAMPING MEANS
Original Filed July 29, 1955 2 Sheets-Sheet 2
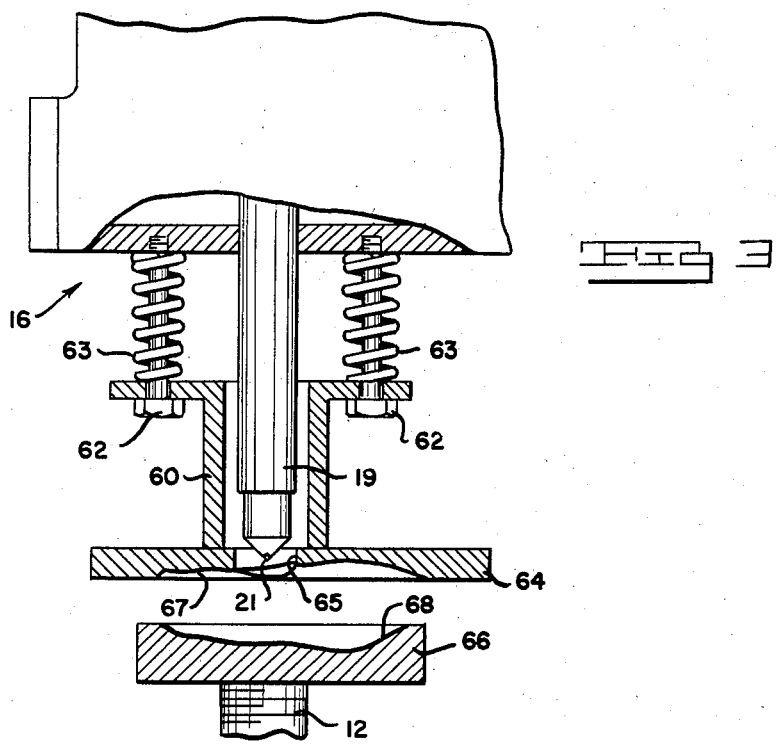
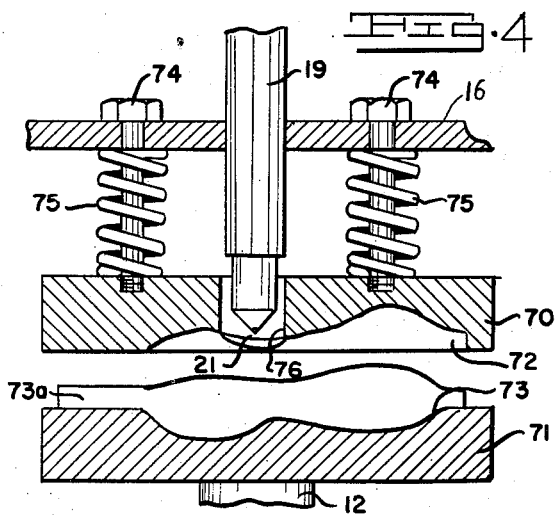
INVENTOR.
CLYDE W. CLARK, Sr.
BY
ATTORNEYS

United States Patent Office 2,850,894
Patented Sept. 9, 1958

2,850,894

HARDNESS TESTER WORK PIECE CLAMPING MEANS

Clyde W. Clark, Sr., Dearborn, Mich., assignor to Clark Instrument Company, Dearborn, Mich.

Original application July 29, 1955, Serial No. 525,295, now Patent No. 2,804,769, dated September 3, 1957. Divided and this application January 18, 1957, Serial No. 634,916

2 Claims. (Cl. 73—83)

This application is a division of my prior application Ser. No. 525,295 of July 29, 1955, now Patent No. 2,804,769 of September 3, 1957.

This invention relates to a hardness tester work piece clamping means, that is to say, a means for clamping a work piece while it is being tested in a hardness testing machine.

Objects and advantages of this invention will become apparent upon reading the following specification and the attached drawings.

In these drawings:

Fig. 1 illustrates a conventional hardness testing machine equipped with my novel clamping means;

Fig. 2 is a cross-sectional view of a portion of a hardness testing machine and shows a first modification of clamping means;

Fig. 3-4 are cross-sectional views similar to Fig. 2 but illustrating second and third embodiments of clamping means.

Fig. 1 shows a conventional hardness testing machine having a C-shaped frame 10.

A work-piece supporting anvil 11 is provided to be adjustable upwards and downwards from the base 13 of the frame by means of a threaded screw 12 connected to the anvil. The screw is mounted within a cylindrical housing and a hand adjustment wheel 15 is provided to threadedly move the screw upwards and downwards. This structure is all conventional and may be found in various similar forms upon the conventional machines now on the market.

The top or head 16 of the machine is formed with a pair of aligned bores 17 and 18 through which the work-piece testing spindle 19 is slidably inserted. This spindle has a lower end 20 fitted with a penetrator point 21 formed of diamond or steel or the like. (See Fig. 2.)

To operate this conventional machine, the work-piece 25 is placed upon an anvil 12 and then the anvil is raised until the penetrator point 21 pierces the surface of the work-piece. This movement of the work-piece toward the penetrator point by means of moving the anvil provides the minor load which is the initial load applied before the actual test is run. Thereafter, a major load is applied to the top of the spindle 26 by means of an arm 27 pivoted to the frame at 28 and placed under a load by means of weights 29 (see Fig. 1). Normally a tripping mechanism is supplied on these machines to trip the major load weights to thereby apply the major load to the spindle and force the spindle downward into the work-piece. In Fig. 1 there is illustrated a handle 30 which operates the tripping mechanism. However, this mechanism is not further shown since it forms no part of the invention.

When the spindle moves downward into the work-piece under the major load, a lever 35 pivoted to the frame at 36 and loosely interconnected with the spindle at 37 swings downwardly at 37 with the spindle and upwardly at its opposite end 38 to cause an indicator dial plunger 39 to move upwardly and thereby cause a reading on the face of a standard dial indicator 40. This reading may be shown in terms of depth of penetration or, more commonly, as a Brinell or a Rockwell hardness reading.

All the above structure is well known and is described merely to set forth the environment of my invention.

Referring to Fig. 2 again, the work-piece clamping means consists of a collar 41 which surrounds the lower end of the spindle and the penetrator point 21. This collar is spring biased away from the top or head of the machine frame by means of a coil spring 42 which, in this case, surrounds the spindle. A collar retaining means in the form of a tube 43 surrounds the collar and is provided with grooves 44 within which protuberances 45 formed on the collar, ride. The coaction between the protuberances and the grooves prevent the collar from moving too far away from the head or from becoming loose and disengaged from its proper position.

In order to adjust the spring tension, the tube 43 is threadedly inter-engaged with an outer annular flange member 46 which is rigidly secured to the head of the machine as shown at 47 in the drawings. To tighten the spring, the tube is threaded upwardly into the flange member 46.

The collar 41 functions, in operation, to press against the work-piece when the anvil is being moved toward the penetrator point to apply the minor load. The collar, thus, is forced upward toward the head of the machine and the load which is transmitted through the compression spring causes the machine frame to spring or yield to take up its inherent resilient slack. Thereafter, the collar clears the penetrator point which pierces the work-piece and rigidly clamps it in position during the test so that the work-piece may not slip off the anvil or slip out of position.

Fig. 3 shows a collar 60 having a lower plate 64 to clamp against a work piece. The collar is slidably connected to the head 16 by bolts 62 and compression springs 63 resist the motion of the collar towards the head.

Plate 64 has a central opening 65 through which the penetrator point 21 may pass.

Anvil plate 66 as well as the head plate 64 are each grooved and surface contoured at 68 and 67 respectively to interengage with and to receive the contoured surfaces of a curved or otherwise odd shaped work piece to be tested.

Fig. 4 shows a head plate 70 and an anvil plate 71, contoured at 72 and 73 to receive and clamp a curved work piece 73a.

The plate 70 is secured to the head 16 of the testing machine by bolts 74 and is movable upwardly towards the head of the machine which motion is resisted by the compression springs 75. Plate 70 is centrally apertured at 76 so that the penetrator point 21 may pass through and contact the surface of the workpiece.

I claim:

1. In a hardness tester comprising a head, a load applying spindle mounted vertically in said head and extending downwardly therefrom and having a work piece contacting lower end, and a work piece supporting anvil below and in alignment with the spindle, the combination of a workpiece clamping plate on said anvil and above it, a work piece clamping plate on said head below said spindle with an opening through which the spindle may pass downwardly to contact the upper surface of a work piece on said anvil plate and the lower face normally spaced downwardly from said head a greater distance than the spindle workpiece lower end, means mounting the head plate on the head, with the head plate being movable towards and away from the head, and a spring means between the head plate and the head for resiliently resisting the movement of the head plate towards the head and for urging the head plate down from the head, said plates being of horizontal areas considerably greater than the cross-sectional areas of the spindles and anvils normally found in such machines, and considerably greater than the area of the head plate opening, whereby they may function as large area clamping means for work pieces of considerable horizontal area, the plates having their adjacent faces contoured to receive snugly and clamp tightly a work piece between them, with the spring means being of such strength as to exert a considerable biasing pressure downwardly on the head plate and thus cause the latter tightly to clamp a work piece between the plates.

2. A construction according to claim 1 wherein the spring means comprises two separate springs arranged on opposite sides of the spindle and spaced laterally from it a substantial distance, whereby the downward bias of the spring means on the head plate is applied at a plurality of points remote from the spindle.

References Cited in the file of this patent

UNITED STATES PATENTS

| | | |
|---|---|---|
| 1,806,767 | Shore | May 26, 1931 |
| 2,742,781 | Ernst | Apr. 24, 1956 |

FOREIGN PATENTS

| | | |
|---|---|---|
| 384,885 | Great Britain | Dec. 15, 1932 |
| 568,911 | Germany | Jan. 26, 1933 |